H. EGLESTON.
Shaping-Block for Garments.

No. 163,467.    Patented May 18, 1875.

Witnesses:
Frank F. Betts
Chas. Betts

Inventor:
Henry Egleston

UNITED STATES PATENT OFFICE.

HENRY EGLESTON, OF ST. JOSEPH COUNTY, MICHIGAN.

IMPROVEMENT IN SHAPING-BLOCKS FOR GARMENTS.

Specification forming part of Letters Patent No. 163,467, dated May 18, 1875; application filed December 30, 1874.

*To all whom it may concern:*

Be it known that I, HENRY EGLESTON, of the county of St. Joseph and State of Michigan, have invented a new and useful machine, which I term a Pants-Bottom Springer and Shoulder-Seam Presser, for shaping and forming the bottoms of the legs of pantaloons, and for pressing the shoulder-seams of coats; and I hereby declare that the following is a full, clear, and exact description of the construction and operation of the same, reference being had to the annexed drawings making a part of this specification, in which—

Figure 1:
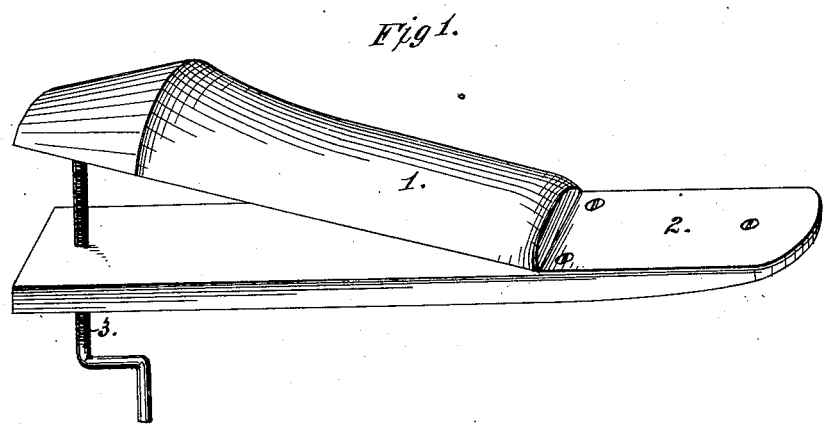
Figure 2:
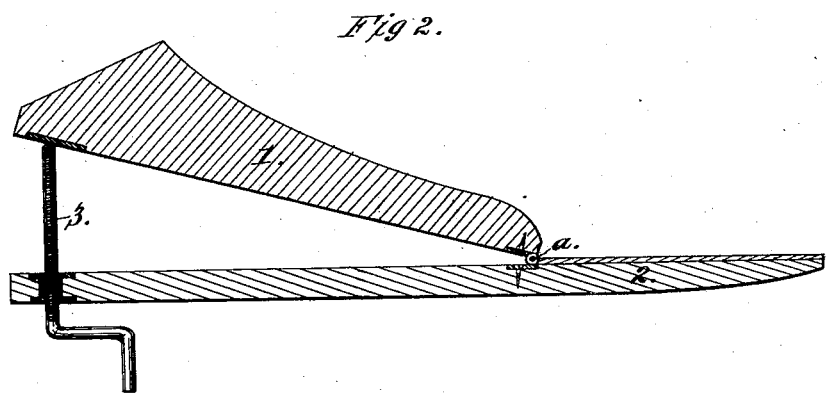

Figure 1 is a side elevation of the apparatus, and Fig. 2 a longitudinal section of same.

The forming-block No. 1 is attached to the table No. 2 by means of a hinge, *a*. The adjusting-screw No. 3 works in a nut in the table or board No. 2.

The machine is slipped into the legs of pantaloons, and the forming-block raised, by means of the adjusting-screw, sufficiently to give the required shape, and enable the workman to press the garment.

In order to press the shoulder-seams of coats the front end of the forming-block No. 1 is inserted in the sleeve at the shoulder, and the seam pressed down.

What I claim as my invention, and desire to secure by Letters Patent, is—

The forming-block No. 1, in combination with the table or board No. 2 and adjusting-screw No. 3, when constructed and arranged to operate substantially as herein described, and for the purpose specified.

HENRY EGLESTON.

Witnesses:
CHAS. BETTS,
FRANK F. BETTS.